United States Patent [19]

Eckert

[11] Patent Number: 4,769,158

[45] Date of Patent: Sep. 6, 1988

[54] MOLTEN METAL FILTRATION SYSTEM USING CONTINUOUS MEDIA FILTER

[75] Inventor: Charles E. Eckert, Plum Boro, Pa.

[73] Assignee: Aluminum Company of America, Pittsburgh, Pa.

[21] Appl. No.: 939,146

[22] Filed: Dec. 8, 1986

[51] Int. Cl.[4] .................. B01D 33/00; B01D 36/02; B01D 37/00

[52] U.S. Cl. ................... 210/780; 210/806; 210/297; 210/387; 210/400; 210/500.1

[58] Field of Search .............. 210/773, 780, 783, 791, 210/297, 262, 387, 400, 398, 500.1, 806, 401; 266/227; 164/266; 75/93 R

[56] References Cited

U.S. PATENT DOCUMENTS

| 307,707 | 11/1884 | Byerley | 210/400 |
|---|---|---|---|
| 794,631 | 7/1905 | Milne | 210/387 |
| 4,007,923 | 2/1977 | Chia | 210/773 |
| 4,481,108 | 11/1984 | Bratten | 210/387 |
| 4,556,535 | 12/1985 | Bowman et al. | 420/580 |

FOREIGN PATENT DOCUMENTS

| 2031943 | 11/1970 | France | 210/387 |
|---|---|---|---|
| 2146915 | 5/1985 | United Kingdom | 210/400 |
| 517643 | 8/1976 | U.S.S.R. | 266/227 |

OTHER PUBLICATIONS

Eckert et al., "An Experimental Technique for Determining Specific Cake Resistance Values in the Cake Mode Filtration of Aluminum Alloys", in *Light Metals* 1985 (Proceedings of the Technical Sessions sponsored by the TMS Light Metals Committee, 114th Annual Meeting, Feb. 24–28, 1985, published by the Metallurgical Society of AIME, edited by H. O. Bohner, pp. 1224–1248.

Eckert et al., "Molten Metal Filtration: Fundamentals and Models" in *Light Metals* 1984 (Proceedings of the Technical Sessions sponsored by the TMS Light Metals Committee, 113th Annual Meeting, Feb. 27–Mar. 1, 1984, published by the Metallurgical Society of AIME), edited by J. P. McGeer, pp. 1281–1304.

*Primary Examiner*—Richard V. Fisher
*Assistant Examiner*—Linda S. Evans
*Attorney, Agent, or Firm*—Andrew Alexander; John P. Taylor

[57] ABSTRACT

An improved filter system is disclosed for filtering a liquid media such as molten metal, e.g., molten aluminum and aluminum base alloys, the system comprises a housing containing a first chamber into which molten metal to be filtered passes, a second chamber in the housing, a filter cloth that separates the first chamber from the second chamber, a high specific flow static filter in the second chamber, and means for moving the filter cloth in the housing to expose fresh surfaces of filter cloth to the metal being filtered to inhibit clogging of the filter cloth means by buildup of the filter cake and maintaining a constant high level of filtration efficiency.

14 Claims, 3 Drawing Sheets

MOLTEN METAL FILTRATION SYSTEM USING CONTINUOUS MEDIA FILTER

BACKGROUND OF THE INVENTION

1. Field of the Invention

This invention relates to the filtration of a molten metal. More particularly, this invention relates to the filtration of a molten metal such as a molten aluminum alloy using cake mode filtration on a moving filter cloth.

2. Description of the Related Art

The production of aluminum base alloys has become of increasing interest due to the combination of low weight and high strength which such an alloy can be made to possess. However, the production of aluminum base alloys such as aluminum-magnesium or aluminum-lithium is significantly more difficult than that of other aluminum base alloys due to the reaction of these alloys with refractory linings in the furnace, the rapid rate of oxidation of lithium and magnesium, hydrogen pick-up by the molten alloy, caustic fume evolution, and composition gradients in the cast ingot due to the propensity of lithium and magnesium to oxidize during processing of the molten alloy.

After degassing the molten aluminum, any remaining solids or inclusions such as oxides must be removed by filtration. However, the use of conventional filtration media has been unsatisfactory due to formation of compressible cakes which rapidly plug a conventional static cake-mode or deep bed filter. Furthermore, the chemically aggressive nature of aluminum base alloys such as aluminum-lithium alloys quickly degrade conventional ceramic-based filter media.

In a paper coauthored by me entitled "Molten Metal Filtration: Fundamentals and Models", given at the Proceedings of the Technical Sessions sponsored by the TMS Light Metals Committee at the 113th Annual Meeting on Feb. 27–Mar. 1, 1984 and published by the Metallurgical Society of AIME in Light Metals 1984 at pp 1281–1304, the removal of inclusions from an aluminum melt using the separation processes of sedimentation, floatation, cake mode filtration, and deep bed filtration was discussed and an in-depth treatment of cake mode and deep bed filtration was given.

In another paper which I coauthored entitled "An Experimental Technique for Determining Specific Cake Resistance Values in the Cake Mode Filtration of Aluminum Alloys", given at the Proceedings of the Technical Sessions sponsored by the TMS Light Metals Committee at the 114th Annual Meeting on Feb. 24–28, 1985 and published by the Metallurgical Society of AIME in Light Metals 1985 at pp 1224–1248, a model for cake filtration was presented where the cake and filter media resistance to the flow of molten metal was discussed and quantified. Filtration experiments using reticulated foam filter media with three different alloy melts were described. In this paper, it was pointed out on page 1232 that the rate of filtration decreases with increasing filtration time due to increasing flow resistance offered by the cake.

It would, therefore, be desirable to provide a filter media system which, while taking advantage of cake mode type filtration, would not experience the rapid clogging, as well as filter media degradation, previously experienced with such cake mode filtration.

SUMMARY OF THE INVENTION

It is, therefore, an object of the invention to provide an improved filtration system for the filtering of molten metals.

It is another object of the invention to provide an improved filtration system for the filtering of molten metals such as molten aluminum and aluminum base alloys using cake mode filtration.

It is yet another object of the invention to provide an improved filtration system for the filtering of molten metals such as molten aluminum and aluminum base alloys using a cake mode filter comprising a moving filter on which a cake of separated inclusions is formed.

These and other objects of the invention will be apparent from a reading of the following description and accompanying drawings.

In accordance with the invention, an improved system for filtering molten metal such as molten aluminum and aluminum base alloys, such as aluminum-lithium, aluminum-magnesium, and aluminum-zinc alloys, comprises a housing containing a first chamber into which molten metal to be filtered passes, a second chamber in the housing, a filter that separates the first chamber from the second chamber, a high specific flow static filter in the second chamber, and means for moving the filter in the housing to expose fresh surfaces of filter to the metal being filtered to inhibit clogging of the filter by build-up of the filter cake.

DETAILED DESCRIPTION OF THE INVENTION

The invention comprises a novel system for filtering molten metals or molten media or liquids using a novel form of cake mode filtering wherein a filter cloth, e.g., a filter cloth or blanket, moves through the filter housing to constantly provide new surfaces on which the filter cake may form.

Figure 1:
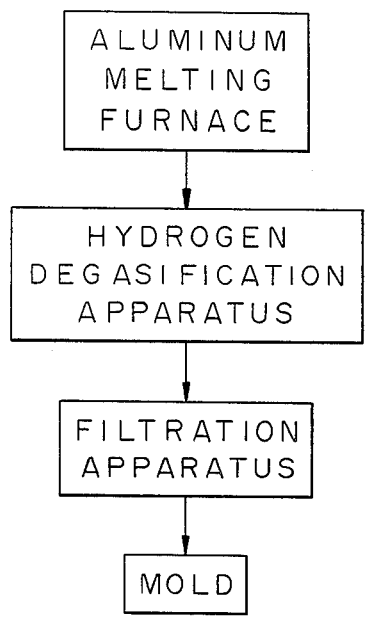
FIG. 1 is a diagrammatic flow sheet showing where the filtration apparatus of the invention may be utilized in the overall system for producing ingot from molten metal alloys.

As shown in the diagrammatic flow sheet of FIG. 1, an aluminum base alloy such as, for example, an aluminum-magnesium alloy is first formed in a furnace and is typically followed by in-line fluxing of the metal alloy to remove gases such as hydrogen. However, inclusions i.e., solid particle contaminants such as metal oxides must also be removed from the molten mass prior to casting the alloy into an ingot or other desired shape.

Figure 2:
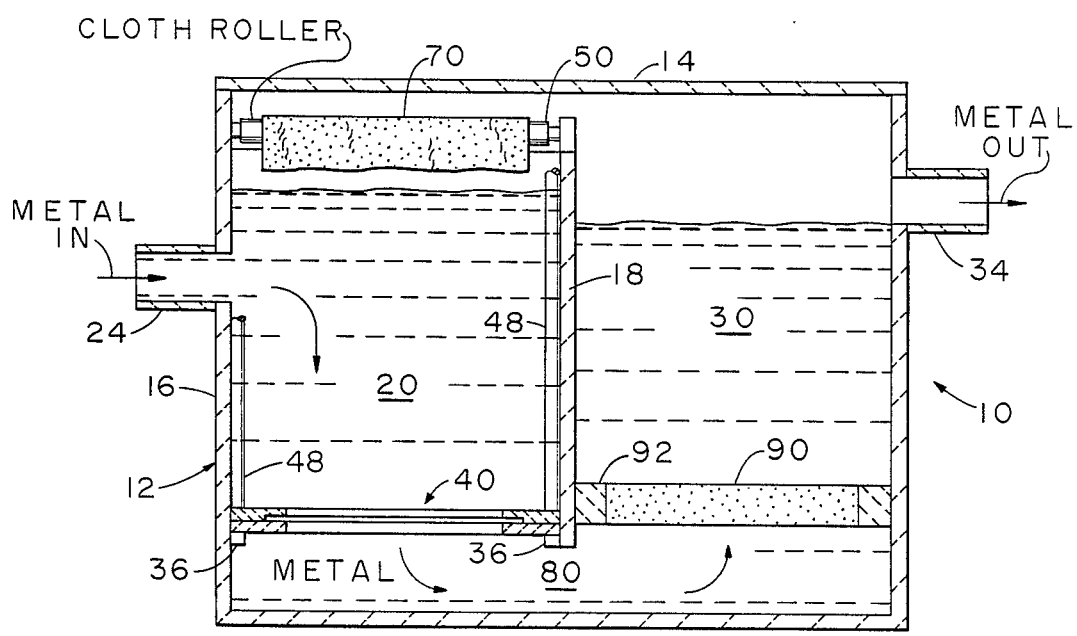
FIG. 2 is a vertical cross-sectional view of the filtration apparatus of the invention.

As shown in FIG. 2, the molten metal alloy is filtered in a system which utilizes a moving cloth as the filtering media. The system generally indicated at 10 comprises a housing 12 which may comprise a refractory material or a metal casing lined by a refractory material capable of withstanding exposure to the particular molten metal or alloy. Examples of such refractory materials, for example, when aluminum-magnesium alloys are filtered, include silicon carbide or silicon nitride. Housing 12 is divided by a center partition 18 into two compartments, 20 and 30. Partition 18, which may be constructed of the same material as housing 12, does not extend to the bottom of housing 12, but rather terminates at a point above the bottom of housing 12 to permit metal flow between compartment 20 and compartment 30 as will be explained. An optional cover 14 is provided over housing 12 to exclude outside gases and permit the molten metal within housing 12 to be protected by an inert gas blanket such as, for example, argon gas.

Figure 3:
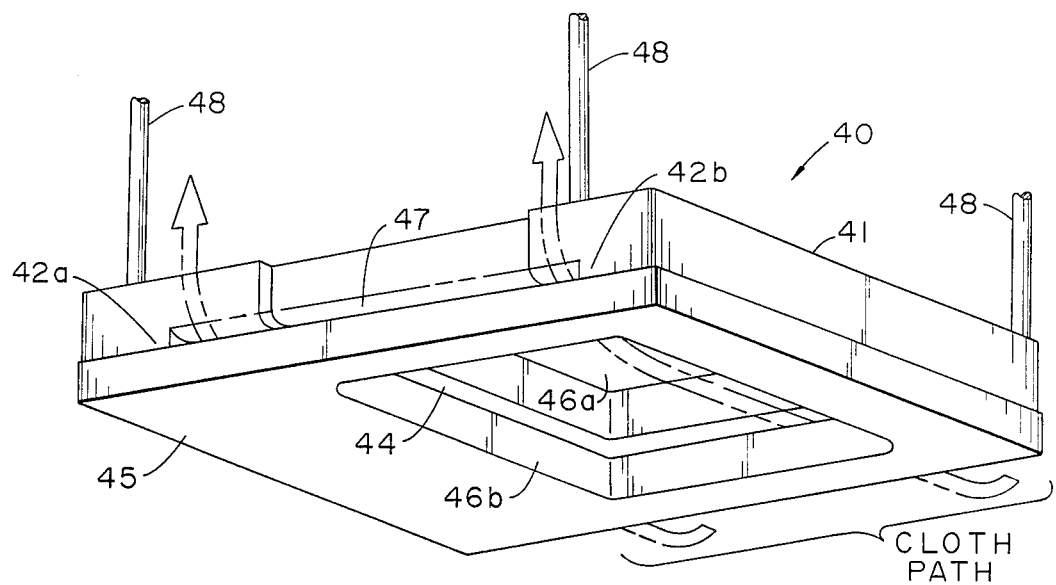
FIG. 3 is an isometric view of a portion of the filtration apparatus of FIG. 2 which guides the filtration cloth along the bottom of the first chamber.
Figure 4:
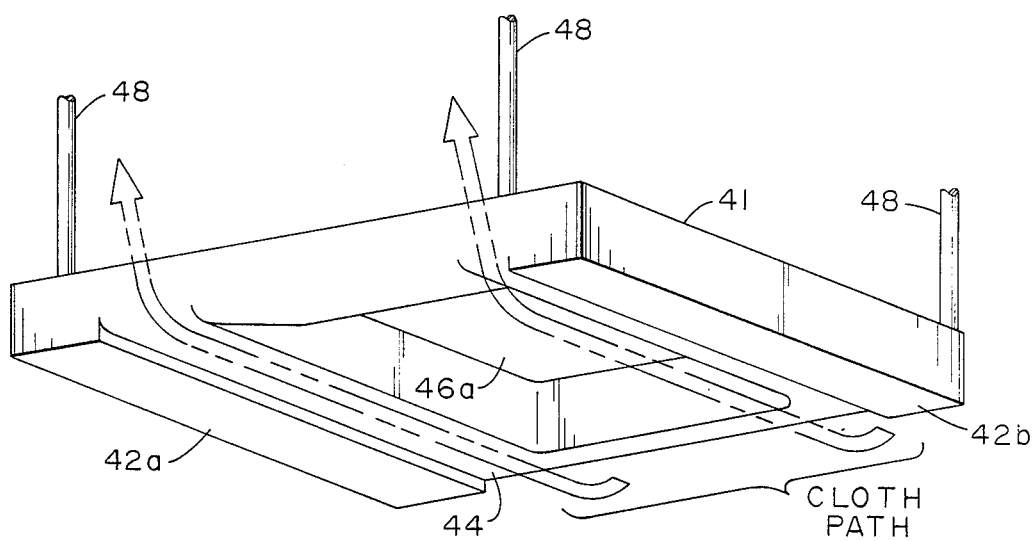
FIG. 4 is an exploded view of the filtration guiding apparatus shown in FIG. 3.
Figure 4:
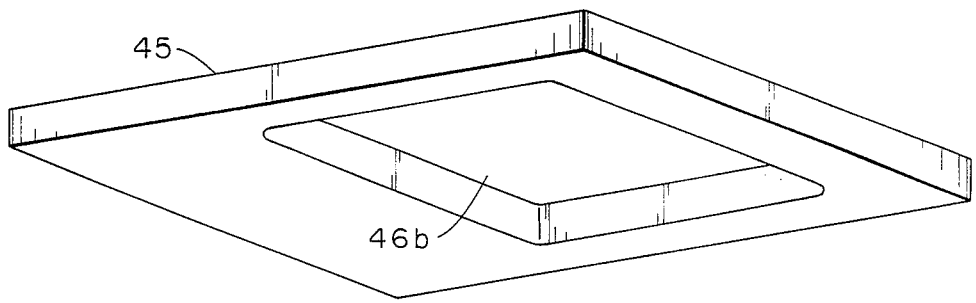
Figure 5:
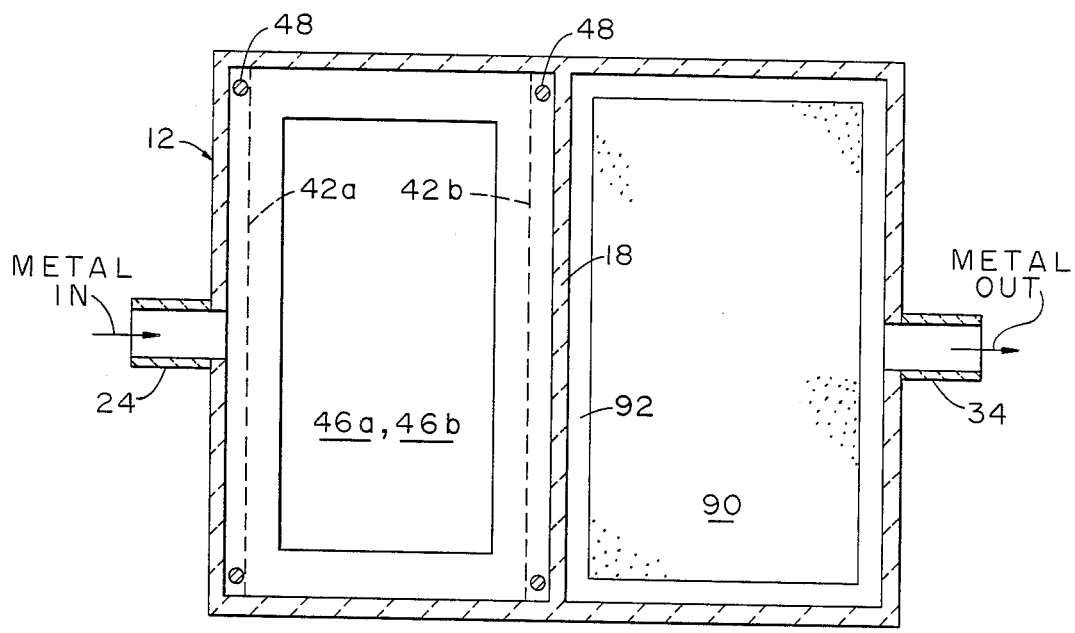
FIG. 5 is a top view of the filtration apparatus shown in FIG. 2.

As seen in FIGS. 2-4, located within housing 12 adjacent the bottom of compartment 20 is a filter support plate assembly 40 which rests on support shoulders or ledges 36 respectively positioned on wall 16 of housing 12 and partition 18 on the other side adjacent the bottom of partition 18. Filter support plate assembly 40, as best seen in FIGS. 3 and 4, comprises an upper plate 41 having parallel shoulders or ribs 42a and 42b extending along two opposite edges of the underside of plate 41 thereby defining a broad groove or track 44 therebetween in which the moving filter cloth will travel as will be explained. Upper support plate 41 also has a central opening 46a formed within track 44 through which filtered metal will flow. Removable hold-down posts 48, provided above filter support plate assembly 40 in the four corners of compartment 20, engage the upper surface of upper support plate 41 to hold assembly 40 in place against the support shoulders or ledges 36.

A lower plate 45, having the same width and length as plate 41 and a central opening 46b there of similar dimensions to opening 46a in plate 41, fits against plate 41 with the openings 46a and 46b in registry. Plate 45, together with the track 44 formed in the underside of upper plate 41, form a slot 47 through which the filter cloth is fed as will be described presently.

Plates 41 and 45 of assembly 40 may comprise, for example, graphite, polished carbon, silicon carbide, or silicon nitride blocks. Plates 41 and 45 may be cemented or otherwise suitably bonded together to form assembly 40.

The height of ribs or guide rails 42a and 42b is preselected so that slot 47, defined between track 44 and the surface of lower plate 45, has a height equal to the thickness of the filter cloth which passes therethrough plus about 0.009 to 0.011 inches, preferably about 0.010 inches to provide slight clearance for the filter cloth while inhibiting any metal leakage therethrough.

Housing 12 is further provided with a metal inlet port 24 leading into compartment 20 and a metal outlet port 34 leading out of compartment 30. Unfiltered metal enters compartment 20 of filtration system 10 at inlet port 24 and filtered metal leaves compartment 30 of the filtration system via outlet port 34.

Located above housing 12 is a first roller 50 and a take-up roller 60 between which extends filter means 70, e.g., filter cloth or blanket or ceramic which is constructed of a material capable of withstanding the temperature of the molten alloy, i.e., about 750° C., as well as the chemical corrosive nature of the molten alloy. In a preferred embodiment, filter cloth 70 may comprise an alumina-borosilicate cloth media. Other materials from which filter cloth media 70 could be constructed include silicon carbide, high alumina, and carbon fibers coated with a protective overcoat of a material such as a lithium aluminate.

The woven filter cloth comprises woven strands wherein each strand comprises from 50–1500 fibers of 0.5 to 4 microns diameter. The filter cloth preferably has a strain or strand count per inch of between 8 and 12, i.e., a weave of about from about $8 \times 8$ or $12 \times 12$.

As seen in FIGS. 2-5, filter 70 unwinds from roller 50 and passes into chamber 20 along the inside wall of housing 12 and then passes into filter support plate assembly 40 through slot 47. Filter 70 travels through filter support assembly 40 in chamber 20 under tension along track 44 between raised shoulders or guide rails 42a and 42b and then passes out of filter support assembly 40 through a similar slot on the opposite side of assembly 40 and back up along the opposite side of chamber 20 up to take up roller 60. Parallel guide rails 42a and 42b act to direct the flow of the filter cloth across the bottom of chamber 20 and provide a seal for the side edges of the filter cloth.

Filter cloth 70 travel through chamber 20 at a rate of speed of as little as about one eighth inch per minute without clogging of the filter cake which forms over the cloth. For a filter area of 144 sq/in (1 ft. $\times$ 1 ft. opening), a speed of one quarter inch per minute (1 foot per 48 minutes) would result in a residence time for the filter cloth passing through the filtering system of about 48 minutes. For a filter cloth roll containing about 20 yards of filter cloth, about 48 hours of continuous filtering could be carried out before needing to change the filter roll.

Figure 6A:
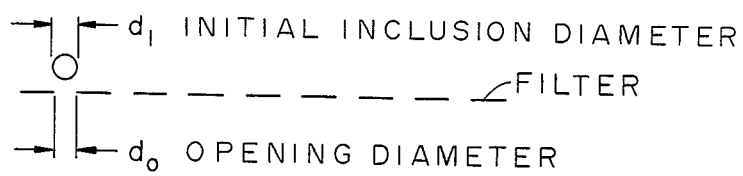
FIGS. 6a–6c are side-section views illustrating the formation and functioning of a cake mode filtration system.
Figure 6B:
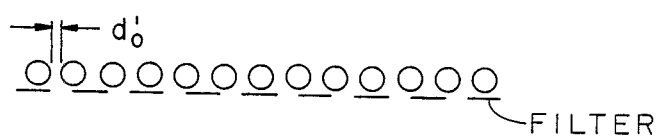
Figure 6C:
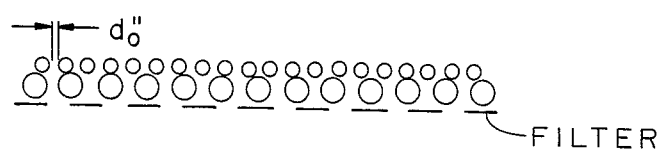

As filter cloth 70 enters chamber 20, inclusions in the molten metal having an inclusion diameter $d_1$ which is larger than the pore diameter $d_o$ of the filter begin to collect on the surface of the filter cloth as shown in FIG. 6a. As these larger inclusions collect and begin to form the filter cake, the effective pore size decreases to $d_1'$ and smaller inclusions are trapped as well as seen in FIG. 6b. These smaller inclusions, in turn, reduce the filter cake pore size still further, as shown in FIG. 6c, to a diameter of $d_1''$.

In the operation of a cake mode filter, the cake progressively builds which increases the filtration pressure as well as filtration efficiency. A particular deficiency of conventional aluminum alloy cake mode filtration processes is that operation must be terminated at a specific filtration pressure, thus limiting the maximum efficiency obtainable by the filtration process. In this development, the surface of the filter media is continuously being renewed to control cake thickness. This, in turn, allows the filter to operate at a constant pressure and a constant level of efficiency. The filtration pressure and efficiency is determined by the rate at which the filter media is renewed. Eventually, of course, this action could result in complete clogging of the filter which is one reason why conventional prior art filters have been unsatisfactory.

However since, in accordance with the invention, filter cloth 70 is moving through chamber 20 and eventually exits the chamber, fresh filter surfaces are constantly provided and as the filter cake on the surface of the filter eventually builds up to a point that no further metal passes through it, the filter cloth, with the built up filter cake thereon, exits chamber 20.

Filtered molten metal alloy passing through the filter cake on filter cloth 70 passes through opening 46 in filter support plate 40 to enter a lower chamber 80 in housing 12 from which the metal flows to chamber 30 through a static filter 90 which is mounted to a filter support plate 92 in housing 12. Static filter 90 may comprise a reticulated vitreous carbon filter having a porosity grade of about 20 to 50 pores per linear inch.

Other materials may be used for this filter media provided they are capable of withstanding both the operating temperature and chemical environment of the corrosive molten metal, e.g., aluminum. Static filter 90 not only provides secondary filtration but also will also trap any inclusions which may become dislodged from the filter cake on filter cloth 70 as it moves through and out of chamber 20. After passing through secondary filter 90 into chamber 30, the filtered molten aluminum alloy leaves filtering system 10 via outlet port 34 from where the molten alloy may be delivered to a casting station as shown in FIG. 1.

Thus the invention provides a means for purifying a molten metal or molten media or a liquid by filtering in a filtering system which, while using a filter cake method to achieve fine filtering, does not rapidly become clogged as do conventional filter cake filtering systems. Instead the filtering system can be run with filtering interrupted only when there is a need to change the filter roll.

Having thus described the invention, what is claimed is:

1. A method of filtering a molten aluminum alloy which comprises:
   (a) introducing the molten aluminum alloy to be filtered into a first chamber defined in a filter housing;
   (b) passing said molten aluminum alloy through an alumina-borosilicate filter cloth at a discharge opening defined in said first chamber;
   (c) moving said alumina-borosilicate filter cloth across said opening defined in said first chamber in said housing at a rate of at least about ⅛ inch per minute to expose fresh surfaces of said filter cloth to said molten aluminum alloy being filtered to inhibit clogging of said filter cloth; and
   (d) passing said filtered molten aluminum alloy through a reticulated vitreous carbon filter to remove any remaining solid material from said molten aluminum alloy including any inclusions which may become dislodged from a filter cake formed on said alumina-borosilicate filter cloth as it moves in said first chamber.

2. The method of claim 1 wherein said step of moving said filter cloth includes the steps of unwinding said filter cloth from a first roller, feeding said filter cloth through a filter plate assembly adjacent said opening defined in said first chamber, and removing said filter cloth from said housing.

3. A system for filtering a molten aluminum alloy comprising:
   (a) a housing;
   (b) a first chamber in said housing into which said molten aluminum base alloy to be filtered passes;
   (c) a second chamber in said housing;
   (d) an alumina-borosilicate filter cloth means separating said first chamber from said second chamber through which said molten aluminum alloy to be filtered passes;
   (e) means for moving said alumina-borosilicate filter cloth means through said housing from a roller through guide means along the bottom of said first chamber to expose fresh surfaces of said alumina-borosilicate filter cloth means to said molten aluminum base alloy being filtered to inhibit clogging of the filter cloth means;
   (f) a third chamber in said housing; and
   (g) secondary filter means between said second and third chambers to filter said aluminum base alloy flowing from said second chamber.

4. A system for filtering a molten aluminum alloy comprising:
   (a) a housing;
   (b) means defining a first chamber in said housing into which said molten aluminum alloy to be filtered passes, said first chamber having a bottom;
   (c) means defining a second chamber in said housing;
   (d) filter cloth means comprising an alumina-borosilicate filter cloth separating said first chamber from said second chamber through which said molten aluminum alloy to be filtered passes;
   (e) means for moving said alumina-borosilicate filter cloth in said housing to expose fresh surfaces of said filter cloth to said molten aluminum alloy being filtered to inhibit clogging of said filter cloth means;
   (f) means defining a third chamber in said housing; and
   (g) a reticulated vitreous carbon secondary filter positioned between said second chamber and said third chamber to trap any inclusions which may become dislodged from said filter cloth means as said filter cloth means moves in said housing, whereby said molten aluminum alloy passing through said filter cloth means into said second chamber also passes through said secondary filter to said third chamber.

5. The system of claim 4 wherein said filter cloth means includes a filter cloth roll from which filter cloth is fed into said housing.

6. The system of claim 6 wherein said filter cloth means further includes means for directing said filter cloth through said housing.

7. The system of claim 5 wherein said filter cloth means further comprises a filter support plate assembly means provided in the bottom of said first chamber.

8. The system of claim 7 wherein said filter support plate assembly means comprises guide means therein comprising upper and lower filter support plates between which said filter cloth passes along the bottom of said first chamber.

9. The system of claim 8 wherein said guide means includes parallel guide rails on opposite sides of one of said filter support plates defining a track of controlled depth therebetween extending from a first slot on one end of said filter plate assembly to a second slot on the opposite end of said filter plate assembly, said parallel guide rails acting to direct the flow of said filter cloth across the bottom of said first chamber and providing a seal for the side edges of said filter cloth.

10. The system of claim 9 wherein each of said filter support plates includes means defining a central opening therein through which molten metal, passing through said filter cloth between said plates, flows into said second chamber.

11. The system of claim 10 wherein said filter cloth has a strand count of from 8 to 12 strands per inch.

12. The system of claim 11 wherein each of said strands comprises from 50–1500 fibers of 0.5 to 4 microns diameter.

13. The system of claim 7 wherein said filter support plate assembly means are constructed of a material selected from the class consisting of graphite, polished carbon, silicon carbide, and silicon nitride.

14. The system of claim 7 wherein said filter support plate assembly means are constructed of a material selected from the class consisting of graphite and polished carbon.

* * * * *